Figure 1:
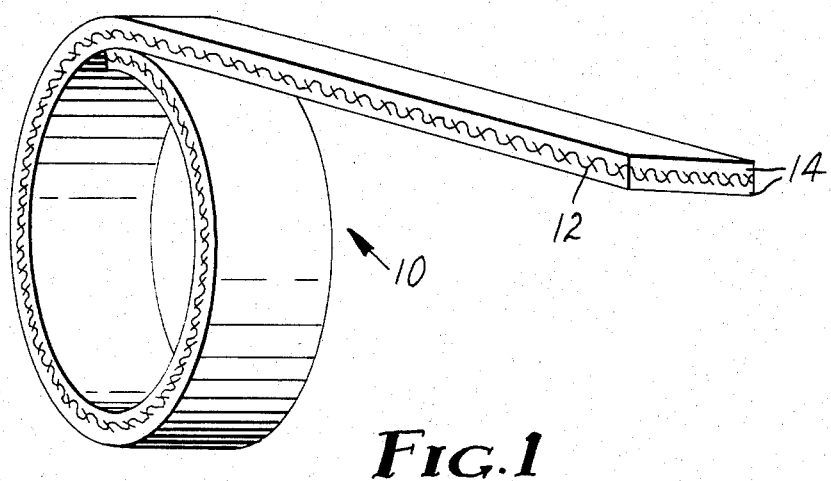

United States Patent [19]

Esmay

[11] Patent Number: 4,522,870
[45] Date of Patent: Jun. 11, 1985

[54] LINERLESS DOUBLE-COATED PRESSURE-SENSITIVE ADHESIVE TAPE

[75] Inventor: Donald L. Esmay, Coon Rapids, Minn.

[73] Assignee: Minnesota Mining and Manufacturing Company, St. Paul, Minn.

[21] Appl. No.: 481,813

[22] Filed: Apr. 4, 1983

Related U.S. Application Data

[63] Continuation-in-part of Ser. No. 439,047, Nov. 3, 1982.

[51] Int. Cl.³ .............................................. B32B 7/00
[52] U.S. Cl. .................................... 428/252; 428/345; 428/354; 428/355; 428/522; 428/906; 427/54.1; 204/159.14
[58] Field of Search ............... 428/343, 344, 345, 354, 428/355, 352, 356, 520, 522, 906, 252; 204/159.14; 427/54.1

[56] References Cited

U.S. PATENT DOCUMENTS

| | | | |
|---|---|---|---|
| 2,889,038 | 6/1959 | Kalleberg | 206/59 |
| 2,956,904 | 10/1960 | Hendricks | 117/93 |
| 4,181,752 | 1/1980 | Martens et al. | 427/54.1 |
| 4,223,067 | 9/1980 | Levens | 428/308 |
| 4,243,500 | 1/1981 | Glennon | 204/159 |
| 4,303,485 | 11/1981 | Levens | 204/159.24 |
| 4,329,384 | 5/1982 | Vesley et al. | 428/40 |
| 4,330,590 | 5/1982 | Vesley | 428/336 |

FOREIGN PATENT DOCUMENTS 747341  11/1966  Canada ............... 154/123

Primary Examiner—George F. Lesmes
Assistant Examiner—E. Rollins Buffalow
Attorney, Agent, or Firm—Donald M. Sell; James A. Smith; Carole Truesdale

[57] ABSTRACT

A linerless double-coated pressure-sensitive adhesive tape of the prior art is wound directly upon itself into a roll that can later be unwound without delamination or offsetting of adhesive. The novel tape differs from the prior tape in that the pressure-sensitive adhesive at each of its faces is a substantially solvent-free, crosslinked alkyl acrylate polymer and can be aggressively tacky for uses requiring high-performance adhesion.

12 Claims, 2 Drawing Figures

LINERLESS DOUBLE-COATED PRESSURE-SENSITIVE ADHESIVE TAPE

CROSS-REFERENCE TO RELATED APPLICATION

This application is a continuation-in-part of Applicant's copending application Ser. No. 439,047, filed Nov. 3, 1982.

FIELD OF THE INVENTION

The invention concerns a linerless double-coated pressure-sensitive adhesive tape which can be wound directly upon itself into a roll for storage and shipment. The tape comprises a flexible support, at each face of which is a pressure-sensitive adhesive.

BACKGROUND ART

Almost all double-coated pressure-sensitive adhesive tapes are wound up with disposable, low-adhesion liners which are discarded when the tapes are unwound for use. Many double-coated tape dispensers are equipped to wind up the liner as the tape is dispensed. This not only makes the dispenser more expensive and awkward to handle, but the user must occasionally take the time to discard the wound liner. Disposal of the liner is especially troublesome in robotic systems.

U.S. Pat. No. 2,889,038 (Kalleberg) discloses a linerless double-coated pressure-sensitive adhesive tape wound upon itself in roll form and comprising a flexible support having on opposite faces chemically different and physically incompatible pressure-sensitive adhesive layers. Although the Kalleberg patent calls both layers "aggressively tacky", the patented linerless transfer tape is not currently used when high performance is required. Even though Kalleberg tapes are currently on the market, it is believed that at the present time all double-coated pressure-sensitive adhesive tapes which have high performance are wound up with disposable, low-adhesion liners. Furthermore, the adhesive layers of the Kalleberg tapes being marketed have a mottled appearance, and it usually is necessary to limit the thickness of each layer to about 0.1 mm.

DISCLOSURE OF INVENTION

The invention concerns a linerless double-coated pressure-sensitive adhesive tape which like that of the Kalleberg patent comprises a flexible support, at each face of which is a pressure-sensitive adhesive, which tape can be wound directly upon itself into a roll that can later be unwound without delamination or offsetting of adhesive. Unlike the Kalleberg tape, both adhesive faces of the novel tape can have truly high performance and can have adhesive and cohesive values equal to those of any pressure-sensitive adhesive tape now on the market. Also, unlike the Kalleberg tape, the novel tape does not require chemically different and physically incompatible adhesives at the two faces of its flexible support. Instead, unwindability is attained in the novel tape in that the pressure-sensitive adhesive at each of its faces (a) is a polymer of predominantly alkyl acrylate, the alkyl groups of which have an average of four to twelve carbon atoms,
(b) is substantially solvent-free,
(c) is crosslinked, and
(d) affords at each face a 180° Peelback Value (as defined below) of at least 10 N/dm.

By "substantially solvent-free" is meant that the pressure-sensitive adhesive contains less than three percent by weight of solvent. The pressure-sensitive adhesive is sufficiently crosslinked when, on attempting to dissolve in heptane at room temperature, the undissolved gel component exceeds 50%.

A pressure-sensitive adhesive which provides a 180° Peelback Value of only 10 N/dm may be characterized as moderately tacky, being just tacky enough to assure reliable adhesion to ordinary paper, metal, glass, plastic, and painted substrates. When the adhesive at each of its faces is aggressively tacky, the novel tape can nevertheless be readily unwound from a linerless roll without delamination or offsetting of adhesive, even after months of storage. Each face of the novel tape can have a 180° Peelback Value as high as that of any pressure-sensitive adhesive tape now on the market, e.g., at least 30 N/dm.

It is surmised that if the adhesive were not substantially solvent-free, the solvent would allow the polymer chains to knit across adjacent convolutions during prolonged storage in roll form, such that perfect separation could no longer be assured. In the present state of the art, it would not be commercially feasible to coat a pressure-sensitive adhesive from solution and obtain a pressure-sensitive adhesive layer which is substantially solvent-free.

To keep the amount of solvent to a minimum, the novel tape is preferably made using photopolymerization as in U.S. Pat. No. 4,181,752 (Martens et al). No solvents are used when doing so. Although there inevitably are impurities in the starting materials which may have a solvent effect, such impurities would not comprise as much as three percent by weight of the pressure-sensitive adhesive. The preferred procedure comprises the steps of (1) coating onto each face of a flexible support a substantially solvent-free photopolymerizable monomer mixture comprising an alkyl acrylate, the alkyl groups of which have an average of 4–12 carbon atoms, and a crosslinker, and
(2) then exposing each coating to ultraviolet radiation to polymerize the acrylate to provide a pressure-sensitive adhesive layer which
   (a) is crosslinked and
   (b) affords at each face a 180° Peelback Value of at least 10 N/dm.

The resulting double-coated pressure-sensitive adhesive tape can be wound up into roll form adhesive face to adhesive face and later unwound without delamination or offsetting of adhesive. When the flexible support of the double-coated tape is porous, it may be embedded in a single layer of pressure-sensitive adhesive. Whether or not the flexible support is porous, there may be a pressure-sensitive layer on each face of the support and those two layers may either be identical or different from each other.

Preferably prior to the aforementioned step (1) and before adding the crosslinker, the photopolymerizable mixture is first partially polymerized by ultraviolet radiation to provide a syrup having a coatable viscosity, e.g., 300 to 20,000 centipoises. After adding the crosslinker, the syrup is coated out and then exposed to ultraviolet radiation in an inert environment to complete the polymerization while simultaneously crosslinking the polymer. An inert environment may be provided by plastic film overlays which are fairly transparent to ultraviolet radiation and have low-adhesion surfaces. Biaxially-oriented polyethylene terephthalate film which is about 75% transparent to ultraviolet radiation of 320 to 370 nm is very useful. If instead of covering the polymerizable coating, the polymerization is to be carried out in an inert atmosphere, the permissible oxygen content of the inert atmosphere can be increased by mixing into the polymerizable composition an oxidizable tin compound as taught in U.S. Pat. No. 4,303,485 (Levens), which also teaches that by doing so, thick coatings can be polymerized in air. If the monomer mixture is partially polymerized and the polymerization is to be completed in situ by heat, it is usually necessary to add additional heat-activatable polymerization initiator to the partially polymerized composition.

Solvents can also be substantially avoided by in situ polymerization by electron beam as suggested in U.S. Pat. No. 4,243,500 (Glennon). See also U.S. Pat. No. 2,956,904 (Hendricks).

The pressure-sensitive adhesive of the novel tape can be substantially solvent-free if polymerized and coated from aqueous systems. However, coatable aqueous emulsions usually contain organic materials which are themselves solvents for pressure-sensitive adhesives, and it may be difficult to eliminate them substantially.

To attain high 180° Peelback Value, the pressure-sensitive adhesive of the novel tape may be made using one or more copolymerizable monomers having strongly polar groups such as acrylic acid, methacrylic acid, itaconic acid, acrylamide, methacrylamide, acrylonitrile, methacrylonitrile, or N-vinyl-2-pyrrolidone. Amounts of such copolymerizable monomers up to about 12 mol percent (25 mol percent when using the pyrrolidone) of total monomer tend to provide increased 180° Peelback Value while higher amounts tend to result in decreased 180° Peelback Values unless the tape is heated when the bond is formed. Where heat is to be applied in forming bonds, a strongly polar copolymerizable monomer can provide nearly 50 mol percent of total monomer.

Other useful copolymerizable monomers include vinyl toluene, vinyl chloride, vinylidene chloride, styrene, and diallyl phthalate. One or more of these may be employed in amounts up to 5 mol percent of total monomer without appreciably changing any of the properties of the novel tape.

At constant levels of strongly polar and other copolymerizable monomer, the highest 180° Peelback Values have been attained when the alkyl acrylate monomer includes both a $C_{5-14}$ acrylate and a $C_{1-4}$ acrylate. Preferred as the $C_{5-14}$ acrylate is isooctyl acrylate obtained by esterifying acrylic acid with isooctyl alcohol, a mixture of various isomers of octyl alcohol which is readily available commercially at relatively low prices. Preferred $C_{1-4}$ acrylates are obtained from methyl, ethyl or n-butyl alcohol, which also are readily available at reasonable prices. Acrylic acid is a preferred strongly polar copolymerizable monomer, being both low in cost and easily copolymerizable with the alkyl acrylate, especially by the procedure of the aforementioned U.S. Pat. No. 4,181,752.

Homopolymers of useful alkyl acrylates are weak internally but when crosslinked should develop useful internal strengths as indicated by Shear Values of at least 3 minutes. Higher internal strengths can be achieved through the use of one or more of the strongly polar copolymerizable monomers mentioned above.

Among crosslinking agents useful in making the novel tape by photopolymerization as in the above-cited Martens patent are those which also function as photopolymerization initiators such as 2,4-bis(trichloromethyl)-6-p-methoxystyryl-s-triazine. The chromophore-substituted-halomethyl-s-triazines of U.S. Pat. Nos. 4,329,384 and 4,330,590 are especially useful where a high 180° Peelback Value is desired. Other useful photocrosslinkers are polyacrylic-functional monomers such as trimethylolpropane triacrylate; pentaerythritol tetraacrylate; 1,2-ethylene glycol diacrylate; 1,6-hexanediol diacrylate; and 1,12-dodecanediol diacrylate. Each of these photocrosslinkers is preferably used within the approximate range of 0.05 to 0.5 percent by weight of the polymerizable monomers.

While the reason for the surprising linerless capability of the novel double-coated tape is unknown, it is surmised that the crosslinking knits the polymer chains together at each face of the tape such that the contacting pressure-sensitive adhesive surfaces separate cleanly at their interface when peeled apart. Other phenomena may also be involved. For example, when the polymer is made using one or more copolymerizable monomers having strongly polar groups, those groups may turn inwardly, leaving the relatively nonpolar alkyl chains at the surface, thus providing a release effect.

To enhance immediate adhesion to relatively rough or uneven surfaces, the flexible support of the novel tape may be a resilient foam such as the backing foam of Canadian Pat. No. 747,341 (Engdahl et al). Another technique for enhancing immediate adhesion to relatively rough or uneven surfaces is to incorporate glass microbubbles into the pressure-sensitive adhesive as taught in U.S. Pat. No. 4,223,067 (Levens). Other materials which can be blended with the polymerizable mixtures include reinforcing fibers and agents, fire retardants, and inert fillers. If the polymerization is to be effected by ultraviolet radiation, such materials should allow the radiation to penetrate into the entire coating during the photopolymerization step.

When the flexible support of the novel tape is a transparent plastic film such as polyvinyl chloride, the novel tape can be almost perfectly transparent. Such a tape is especially useful for laminating transparent panels, for applying labels having transparent areas, and for applying transparent protective coverings.

180° Peelback Value

At about 22° C., tape is adhered by its adhesive to a glass or stainless steel test plate under the weight of a 4.5 kg hard rubber roller, 2 passes in each direction. The free end of the tape is attached to a scale, and the test plate is moved away from the scale at an angle of 180° and a rate of about 3.8 cm per second.

Shear Value

At about 22° C., tape is adhered by its pressure-sensitive adhesive to a stainless steel plate under the weight of a 4.5-kg hard rubber roller, 2 passes in each direction, with a free end of tape extending beyond the plate and the adhesive contact area being one-half by one-half inch (1.27 by 1.27 cm). After thirty minutes, the plate is positioned 2° from the vertical to prevent peeling, and a 1-kg mass is suspended from the free end. The time at which the mass falls is noted and the test is discontinued if the tape has not failed after 10,000 minutes.

THE DRAWING

In the drawing:

FIG. 1 is a schematic isometric view of a linerless double-coated pressure-sensitive adhesive tape of the invention wound upon itself in roll form.

Figure 2:
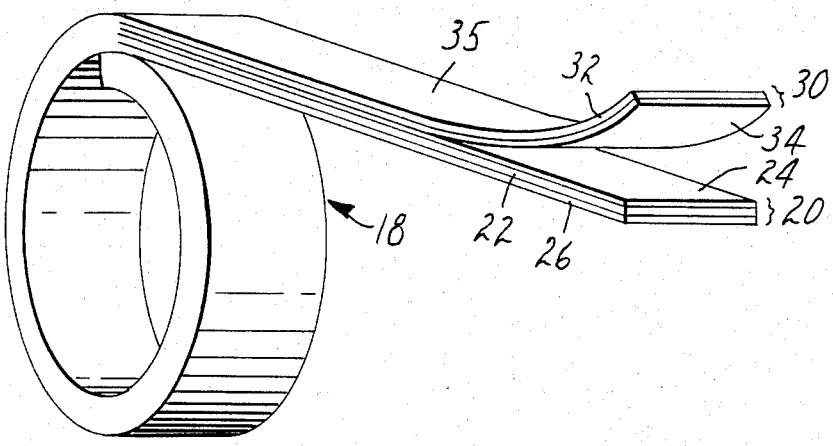

FIG. 2 schematically illustrates a composite of two pressure-sensitive adhesive tapes wound up together into a single roll, one of those tapes being a linerless double-coated pressure-sensitive adhesive tape of the invention.

The linerless double-coated tape 10 of FIG. 1 has a porous flexible cloth support 12 embedded in a single pressure-sensitive adhesive layer 14 so that there is a pressure-sensitive adhesive coating at each face of the tape. Instead of cloth, the flexible support could be a plastic film such as polyvinyl chloride, paper, metal foil, or a nonwoven fibrous web having a pressure-sensitive adhesive layer on each face.

In the composite roll 18 of FIG. 2, a first tape 20 has a flexible plastic film support 22, at each face of which is a pressure-sensitive adhesive layer 24, 26. A second tape 30 has a flexible plastic film support 32 having an uncoated face 35 and a single pressure-sensitive adhesive layer 34 on its other face. The adhesive layer 34 is in face-to-face contact with the adhesive layer 24 of the first tape 20. The two tapes 20 and 30 are shown being peeled apart to be applied separately.

In the following examples, all parts are given by weight.

EXAMPLE 1

To 100 parts of isooctyl acrylate was added 0.04 part of 2,2-dimethoxy-2-phenyl acetophenone photoinitiator (obtainable as "Irgacure" 651). This was partially polymerized by exposure to ultraviolet radiation to provide a viscosity of about 3000 cps. To this was added 0.2 part of 1,6-hexanediol diacrylate crosslinker and an additional 0.1 part of the photoinitiator to provide a first syrup.

A mixture of 96 parts of isooctylacrylate, 4 parts of acrylic acid, and 0.04 part of photoinitiator ("Irgacure" 651) was partially polymerized by exposure to ultraviolet radiation to provide a coatable viscosity of about 3000 cps. After mixing in 0.2 part of 1,6-hexanediol diacrylate and an additional 0.1 part of the photoinitiator to provide a second syrup, this was poured onto the low-adhesion surface of a first disposable plastic film. A film of unprimed, unplasticized, unpigmented polyvinyl chloride of 0.1 mm thickness was laid over the poured-out second syrup, and the composite was drawn beneath a first knife to squeeze the second syrup to a uniform thickness of about 0.05 mm. The first syrup was poured onto the exposed face of the vinyl film, and to this was joined, at a second knife, the low-adhesion surface of a second disposable plastic film. The spacing beneath the second knife was adjusted to squeeze the first syrup to a uniform thickness of about 0.05 mm. The two disposable plastic films served to exclude air from the two coatings.

The full composite was then passed between two banks of ultraviolet lamps, each bank consisting of fluorescent black light bulbs (Sylvania F20T12BL), 90% of the emissions of which were between 300 and 400 nm with a maximum at 351 nm. Each syrup of the composite received 500 mj of energy as measured by an International Light "Light Bug" which is spectrally responsive between 200 and 430 nm, maximum 350 nm. Exposure to the ultraviolet light polymerized each syrup to a pressure-sensitive adhesive state, thus creating a double-coated pressure-sensitive adhesive tape having a central flexible polyvinyl chloride support. The adhesive layer from the second syrup was an ordinary aggressively pressure-sensitive adhesive layer capable of forming strong bonds (180° Peelback Value of 46 N/dm from glass and 42 N/dm from stainless steel; Shear Value of 10,000 minutes) which would experience gradual adhesion buildup typical of pressure-sensitive adhesives of the prior art. The adhesive layer from the first syrup was only moderately tacky (180° Peelback Value of 17 N/dm from glass and 20 N/dm from stainless steel; Shear Value of 12 minutes) and would not experience appreciable buildup in adhesion to ordinary substrates. On attempting to dissolve in heptane at room temperature, the undissolved gel component of each of the adhesive layers exceeded 50%.

Both disposable plastic films were removed to provide a double-coated linerless pressure-sensitive adhesive tape which was wound directly upon itself into a roll using a 7.6 cm core. Even though it had no liner, the double-coated tape could be unwound without any delamination or transfer of adhesive from one face to the other, even after being stored for six months at ordinary room temperatures.

EXAMPLE 2

A linerless double-coated pressure-sensitive adhesive tape was made as in Example 1 except that the adhesive layer made from the second syrup was a copolymer of 90 parts of isooctyl acrylate and 10 parts of acrylic acid, its crosslinker was replaced by 0.15 part of

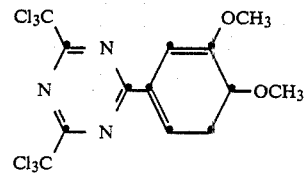

crosslinker, and the polymerizable mixture included 35 parts of pentabromodiphenyl oxide as a flame retardant. Also, the first photopolymerizable syrup included 35 parts of that flame retardant per 100 parts of polymerizable material. In the resulting tape, the adhesive layer made from the second syrup was an ordinary aggressively tacky pressure-sensitive adhesive layer (180° Peelback Value of 74 N/dm from glass and 71 N/dm from stainless steel; Shear Value of 10,000 minutes), and the adhesive layer made from the first syrup had low tack and was cleanly peelable from ordinary substrates after prolonged dwell. In heptane at room temperature, the undissolved gel component of each adhesive layer exceeded 50%. The tape of Example 2 was wound directly upon itself without a liner and was later easily unwound without delamination or offsetting of adhesive.

EXAMPLE 3

A linerless double-coated pressure-sensitive adhesive tape was made as in Example 1 except that the central flexible support was biaxially-oriented polyethylene terephthalate film and both adhesive layers were identical to that made from the first syrup of Example 1. The polyethylene terephthalate film had a thickness of 0.05 mm, and one of its faces had an adhesion-promoting coating while its other face was untreated. This tape was wound upon itself into roll form without a liner. After six months at ordinary room temperatures, it could be unwound easily without any delamination or adhesive transfer and could be put to uses requiring both assured immediate adhesion and easy removability after being in place for prolonged periods of time.

EXAMPLE 4

A linerless double-coated pressure-sensitive adhesive tape was made as in Example 1 except that one of its adhesive layers was a copolymer of 99.2 parts of isooctyl acrylate and 0.8 part of acrylic acid, and the other was a homopolymer of isooctyl acrylate. Also, the 1,6-hexanediol diacrylate crosslinker was employed in amounts of 0.32 part in making the copolymer layer and 0.22 part in making the homopolymer layer. The copolymer layer had 180° Peelback Value of 22 N/dm from glass and 24 N/dm from stainless steel; Shear Value of 80 minutes. The homopolymer layer had 180° Peelback Value of 22 N/dm from glass and 24 N/dm from stainless steel; Shear Value of 5 minutes. The tape was wound directly upon itself using a 1.9-cm core and placed in an oven at 70° C. for three days. After cooling to room temperature, it was unwound easily without any adhesive transfer.

EXAMPLE 5

To a mixture 90 parts of isooctyl acrylate and 10 parts of acrylic acid was added 0.04 part of 2,2-dimethoxy-2-phenyl acetophenone photoinitiator. This was purged with nitrogen and partially polymerized by exposure to ultraviolet radiation to provide a viscosity of about 3000 cps. To this was added 0.2 part of 1,6-hexanediol diacrylate crosslinker and an additional 0.1 part of the photoinitiator to provide a syrup.

This syrup was coated onto each face of a biaxially-oriented polyethylene terephthalate film, one face of which had an ultrathin adhesion-promoting primer layer. The thickness of the film was 0.025 mm and the thickness of each coating was 0.05 mm. Each coating was covered by a transparent disposable plastic film having a low-adhesion surface and received 300 mj/cm$^2$ of ultraviolet radiation through that plastic film as in Example 1. While one disposable plastic film was being removed, the resulting double-coated pressure-sensitive adhesive tape was wound upon itself into a roll without a liner and is here called the first tape.

A second tape was made in the same manner as the first except that only the primed face of the polyethylene terephthalate film was coated. While the first tape was being unwound and the disposable plastic film of the second tape was being removed, the exposed adhesive layers of the two tapes were pressed together to provide a composite. While its remaining disposable plastic film was being removed, the composite was wound upon itself for storage and is below called the composite 18 of FIG. 2.

After being stored for more than a month at ordinary room temperature, the two tapes 20 and 30 of the composite 18 of FIG. 2 were peeled apart as illustrated, and there was no delamination of either tape or any offsetting of adhesive, although the unwind force was rather high. Even though one face of each of the polyethylene terephthalate film supports was unprimed, the adhesive layer 26 of the first tape 20 separated cleanly from the uncoated face 35 of the support 32 of the second tape 30, because much greater adhesion is developed when a partially-polymerized syrup is polymerized in contact with the support. Hence, the adhesion-promoting primer layers could have been omitted from the composite 18.

Each adhesive layer of the composite 18 was aggressively tacky and suitable for uses requiring high-performance adhesion. Each adhesive layer exhibited 180° Peelback Value of about 39 N/dm from glass and 42 N/dm from stainless steel; Shear Value of 10,000 minutes.

The composite 18 of FIG. 2 has been experimentally used as follows. A strip of the composite was peeled apart to provide two strips of equal length, and that of the first tape 20 was used to adhere to a vane of a household clothes dryer a porous packet containing a freshener and an anti-static agent. The strip of the second tape 30 was applied to a small monitoring tag such that it extended beyond all sides of the tag. The strip of the second tape 30 was then adhered by the exposed periphery of its adhesive layer 34 to the door of the dryer. The tag, which was visible through the second tape 30, was designed to show the accumulated time of exposure to temperatures exceeding about 50° C. and indicated when the contents of the packet had been substantially exhausted.

Both the packet and the tag remained adhered to the dryer after 40 cycles and were then cleanly stripped away. The two strips of tape had provided convenient mounting of both devices without the need to dispose of any liners.

What is claimed is:

1. A linerless double-coated pressure-sensitive adhesive tape comprising a flexible support, at each face of which is a pressure-sensitive adhesive, which tape can be wound directly upon itself into a roll that can later be unwound without delamination or offsetting of adhesive, wherein the improvement comprises: each pressure-sensitive adhesive layer
   (a) is a polymerized product of a predominantly alkyl acrylate composition, the alkyl groups of which have an average of 4-12 carbon atoms, each said composition being physically compatible with the other,
   (b) is substantially solvent-free,
   (c) contains a photoinitiator,
   (d) is crosslinked, and
   (e) affords at each face a 180° Peelback Value of at least 10 N/dm.

2. A linerless double-coated tape as defined in claim 1 wherein the pressure-sensitive adhesive at each face of the support has a 180° Peelback Value of at least 30 N/dm.

3. A linerless double-coated tape as defined in claim 1 having at opposite faces of the support pressure-sensitive adhesives which are chemically different.

4. A linerless double-coated tape as defined in claim 1 having the same pressure-sensitive adhesive at both faces of the support.

5. A linerless double-coated tape as defined in claim 4 wherein said flexible support is a porous web embedded in a single pressure-sensitive adhesive layer.

6. A linerless double-coated tape as defined in claim 1 wherein the pressure-sensitive adhesive at at least one face of its support is a copolymer of alkyl acrylate and at least one copolymerizable polar acrylic monomer in an amount providing up to 12 mol percent of total monomers.

7. A linerless double-coated tape as defined in claim 6 wherein said polar monomer is one or more of acrylic acid, methacrylic acid, itaconic acid, acrylamide, methacrylamide, acrylonitrile, methacrylonitrile, and N-vinyl-2-pyrrolidone.

8. A linerless double-coated tape as defined in claim 7 wherein said copolymer is a copolymer of at least one of vinyl toluene, vinyl chloride, vinylidene chloride, styrene, and diallyl phthalate in amounts providing up to 5 mol percent of total monomer.

9. A linerless double-coated tape as defined in claim 1 which is wound directly upon itself into a roll.

10. Method of making a linerless double-coated pressure-sensitive adhesive tape comprising the steps of
   (1) coating onto each face of a flexible support a substantially solvent-free photopolymerizable mixture comprising an alkyl acrylate, the alkyl groups of which have an average of 4-12 carbon atoms, each said photopolymerizable mixture being physically compatabile with the other said mixture, and a crosslinker, and
   (2) then exposing each coating to ultraviolet radiation to polymerize the acrylate to provide a pressure-sensitive adhesive layer which
      (a) is crosslinked, and
      (b) affords at each face a 180° Peelback Value of at least 10 N/dm,
   which tape can be wound up adhesive face to adhesive face and later unwound without delamination or offsetting of adhesive.

11. Method as defined in claim 10 wherein prior to step (1) and before adding the crosslinker, the photopolymerizable mixture is first partially polymerized by ultraviolet radiation to provide a syrup having a coatable viscosity.

12. Method as defined in claim 10 including the further step
   (3) winding the tape directly upon itself into a roll.

* * * * *